(12) United States Patent
Peng et al.

(10) Patent No.: US 10,164,837 B2
(45) Date of Patent: Dec. 25, 2018

(54) DETERMINING SERVER LOCATION IN A DATA CENTER

(71) Applicant: EMC Corporation, Hopkinton, MA (US)

(72) Inventors: Layne Lin Peng, Shanghai (CN); Jing Chen, Shanghai (CN); Jie Zeng, Shanghai (CN); Lynn Xin Lin, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 95 days.

(21) Appl. No.: 15/180,423

(22) Filed: Jun. 13, 2016

(65) Prior Publication Data

US 2016/0380834 A1    Dec. 29, 2016

(30) Foreign Application Priority Data

Jun. 25, 2015    (CN) .......................... 2015 1 0358885

(51) Int. Cl.
*H04L 12/24*    (2006.01)
*H04W 4/04*    (2009.01)
*H04W 84/12*    (2009.01)

(52) U.S. Cl.
CPC ............... *H04L 41/12* (2013.01); *H04W 4/04* (2013.01); *H04W 84/12* (2013.01); *Y02D 30/30* (2018.01)

(58) Field of Classification Search
CPC ......... H04L 41/08; H04L 41/12; H04L 41/14; H05K 7/1498; G06F 11/22; G06F 11/3051; G06F 15/161; H04W 4/04; H04W 4/025; H04W 4/02

See application file for complete search history.

(56) References Cited

U.S. PATENT DOCUMENTS

| | | | |
|---|---|---|---|
| 2003/0046339 A1* | 3/2003 | Ip | H04L 41/12 709/203 |
| 2008/0272887 A1* | 11/2008 | Brey | H04L 41/00 340/10.1 |
| 2011/0258302 A1* | 10/2011 | Cole | G06F 11/006 709/223 |
| 2013/0254428 A1* | 9/2013 | Kodama | G06F 15/161 709/250 |
| 2014/0018111 A1* | 1/2014 | Farley | H04W 4/023 455/456.6 |
| 2014/0277784 A1* | 9/2014 | Mick | G05D 23/1917 700/286 |
| 2015/0005000 A1* | 1/2015 | Gyorfi | H04W 64/006 455/456.1 |

* cited by examiner

*Primary Examiner* — Mohamed A Kamara
(74) *Attorney, Agent, or Firm* — Krishnendu Gupta; Konrad R. Lee (57) ABSTRACT

Embodiments generally relate to a method and device of determining a location of a server in a data center by establishing a relationship between a rack unit where each server of the data center is located and a port of a switch and determining the rack unit where the server is located based on a port of a switch connected to the server and the established relationship, and determining a location of the rack unit where the server is located based on relative positions of the switch connected to the server and a plurality of reference points.

18 Claims, 7 Drawing Sheets

DETERMINING SERVER LOCATION IN A DATA CENTER

RELATED APPLICATION

This application claim priority from Chinese Patent Application Number CN201510358888.0, filed on Jun. 25, 2015 at the State Intellectual Property Office, China, titled "METHOD AND DEVICE OF DETERMINING SERVER LOCATION IN DATA CENTER," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments generally relate to a data center.

BACKGROUND

Location tracking is an important feature of modern data center management, especially in a large scale data center. Location tracking may optimize system maintenance process. Most monitoring tools may be able to tell a system manager, when a virtual or physical device breaks down. On this basis, location of a server may be determined through location tracking to thereby perform maintenance. In addition, location tracking may be used for intelligent workload allocation. Considering factors such as workload balance and disaster isolation, it may be feasible to distribute the same type of services to different geographical locations.

SUMMARY

Embodiments are intended to provide a method and device of determining a location of a server in a data center. According to an embodiment of the present disclosure, there is provided a method of determining a location of a server in a data center by establishing a relationship between a rack unit where each server of a data center is located and a port of a switch; determining the rack unit where the server is located based on a port of a switch connected to the server and the established relationship; and determining a location of the rack where the server is located based on relative positions of the switch connected to the server and a plurality of reference points.

BRIEF DESCRIPTION OF THE DRAWINGS

The figures described herein are used to provide further understanding of the present disclosure and constitute a portion of the present application. Exemplary embodiments of the present disclosure and descriptions thereof are used to illustrate the present disclosure. In the figures.

DETAILED DESCRIPTION

Principles and spirit of the present disclosure are described with reference to several exemplary embodiments shown in the figures. It should be appreciated that these embodiments are described only to enable those skilled in the art to better understand and implement the present disclosure, and not intended to limit the scope of the present disclosure in any manner.

In some embodiments, modern data centers may be usually capable of tracing an application issue to a server, through Platform as A Service (PaaS), Infrastructure as A Service (IaaS), Hypervisor, Container and more layers. In some other embodiments, problems to be solved by a present disclosure may be reduced to determining a location of a server, namely, on which unit in which rack.

In certain embodiments, most data centers usually determine a location of a server by using a physical tag or fixed IP. In certain other embodiments, a physical tag may be RFID or physical mark implementing similar function. In an example embodiment, consider an RFID. In some embodiments, when a rack and a server are arranged, an RFID chip of a server may be scanned to obtain metadata of the server, and then a unit number and a rack number may be input into a system. In some other embodiments, data may be sent to a central management database (CMDB) and information may be updated. In some embodiments, such a process may require a lot of manual inputs. In some embodiments, this method may not automatically determine a location of a rack in a data center, and many issues may be caused particularly when a rack level movement occurs.

In some embodiments, if fixed IP is used, a fixed IP of one port in a switch (e.g., TOR switch) may be bound, and a rack may be positioned using the switch. In some other embodiments, when a server plugs into a network via a switch, it may be assigned a fixed IP. In some other embodiments, a location may be tracked with an assigned fixed IP. In one embodiment, this approach may provide an automatic way of location tracking, but a limitation of IP allocating may not fix in a multi-tenant data center, which have introduced SDN and virtual networking.

In some embodiments, to determine a position of a server, first it may need to be made clear which server in the data center is meant by the server. In some other embodiments, an identifier of a server may need to be determined. In some other embodiments, as stated above, a data center may determine a server through PaaS, IaaS, Hypervisor, or Container, i.e., an identifier of a server is determined. In some embodiments, usually, such an identifier may include a media access control (MAC) address, an IP address and the like. It is noted that embodiments of the present disclosure generally do not limit a type of an identifier, that is, embodiments of the present disclosure may be adapted for any type of identifier, unless otherwise explicitly specified below.

In some embodiments, the term "server" herein may refer to, in addition to server in an ordinary sense, an apparatus such as a storage box mounted with a device (e.g., network interface card (NIC)) capable of communicating with a switch. In some embodiments, the term "rack" may herein refer to any apparatus that may be divided into several units for respectively placing a machine, sometimes called "cabinet". In a further embodiment, a unit of rack may be generally called a rack unit herein, and sometimes called unit without causing confusions. In some embodiments, the term "geographical location" may herein refer to a geographical location of an object on the earth, but generally a geographical location is not a precise location coordinate. In an example embodiment, in terms of a data center, assume three data centers respectively located in Beijing, Shanghai and Guangzhou that may be used, and the geographical location of the data center or rack may generally refer to "Beijing", "Shanghai" and "Guangzhou", or the geographical location may be made as precise as to information such as a house number.

Embodiments of the present disclosure provide a device and a methodof determining a location of a server in a data center. One embodiment may include determining a location of a server in a data center by establishing a relationship between a rack unit where each server of a data center may be located and a port of a switch. A further embodiment may include determining a rack unit where a server may be located based on a port of a switch connected to the server and an established relationship. A further embodiment may include determining a location of a rack where a server may be located based on relative positions of a switch connected to a server and a plurality of reference points. In a further embodiment, a switch may include a top of rack switch. In a further embodiment, a server may be determined based on a media access control address.

In one embodiment, establishing a relationship between a rack unit where each server of a data center may be located and a port of a switch may include associating each server with a port having a port identifier corresponding to a rack unit where each server is located. In one embodiment, determining a rack unit where a server is located based on a port of a switch connected to the server and an established relationship may include determining a port via which a server may be connected to a switch based on a port identifier in a communication protocol used between the server and the port of the switch. A further embodiment may include determining a rack unit where a server may be located based on a determined port and an established relationship.

In one embodiment, determining a port via which a server may be connected to a switch based on a port identifier in a communication protocol used between the server and the port of the switch may include determining a port via which a server may be connected to a switch based on a port identifier included in a predetermined type-length-value of a Link Layer Discovery Protocol used between the server and the port of the switch. In a further embodiment, a predetermined type-length-value may include a Port ID.

One embodiment may include determining a geographic location of a data center based on a communication protocol used between a server and a switch. In a further embodiment, determining a geographic location of a data center based on a communication protocol used between a server and a switch may include determining a geographic location of a data center based on a type-length-value in a Link Layer Discovery Protocol used between a server and a switch. In a further embodiment, a type-length-value may include a Chassis ID.

In one embodiment, determining a location of a rack where a server may be located based on relative positions of a switch connected to the server and a plurality of reference points may include determining distances between a switch and a plurality of reference points. A further embodiment may include determining a location of a rack based on a determined distance.

In one embodiment determining distances between a switch and a plurality of reference points may include: determining a distances between a switch and a plurality of reference points based on attenuation of signals of transmitters at a plurality of reference points as received by the switch. In one embodiment, determining distances between a switch and a plurality of reference points based on attenuation of signals of transmitters at a plurality of reference points as received by the switch may include determining distances between a switch and a plurality of reference based on an International Telecommunication Union indoor propagation model. In a further embodiment, the transmitter may include a WiFi access point. In one embodiment, determining a location of a rack based on a determined distance may include determining a location of a rack by using a multilateration algorithm. A further embodiment provides a computer program product including a program code, when executed on a processor, which causes the processor to perform the method as disclosed above.

In some embodiment, manual configuration may be impossible for a large scale data center. Embodiment of the present disclosure provides a fully automatic solution suitable for a large scale data center, and the solution may be very easily integrated in CMDB or other central management systems. In some embodiment, a network flexibility introduced by SDN and virtual network technologies may be a key feature in a new generation data center. Embodiments of the present disclosure may run at a data link layer, thereby not conflicting therewith. Embodiments of the present disclosure provide a highly cost-effectively solution that may achieve an excellent balance between accuracy and cost. In some embodiment, along with an increase of a number of reference points, a number of laterations of a multi-lateration algorithm increases, and calculation precision also increases. According to an embodiment of the present disclosure, cost of transmitters at reference points may be very low because cost may not increase substantially along with an increase of a number of the reference points.

In some additional embodiments, usually determine performing cross-layer management from an application layer, PaaS layer, IaaS layer and bare machine layer to determine a server to be positioned, particularly may determine a MAC address of a server to be positioned. Embodiments of the present disclosure may be combined with known techniques to implement location tracking of global layers, namely, all changes of application, PaaS components, IaaS components, bare metal machine, unit, rack may be tracked and immediately updated. Embodiments of the present disclosure may further provide a solution about positioning from a topmost layer to a bottommost layer from an application layer to a global geographical location.

Figure 1:
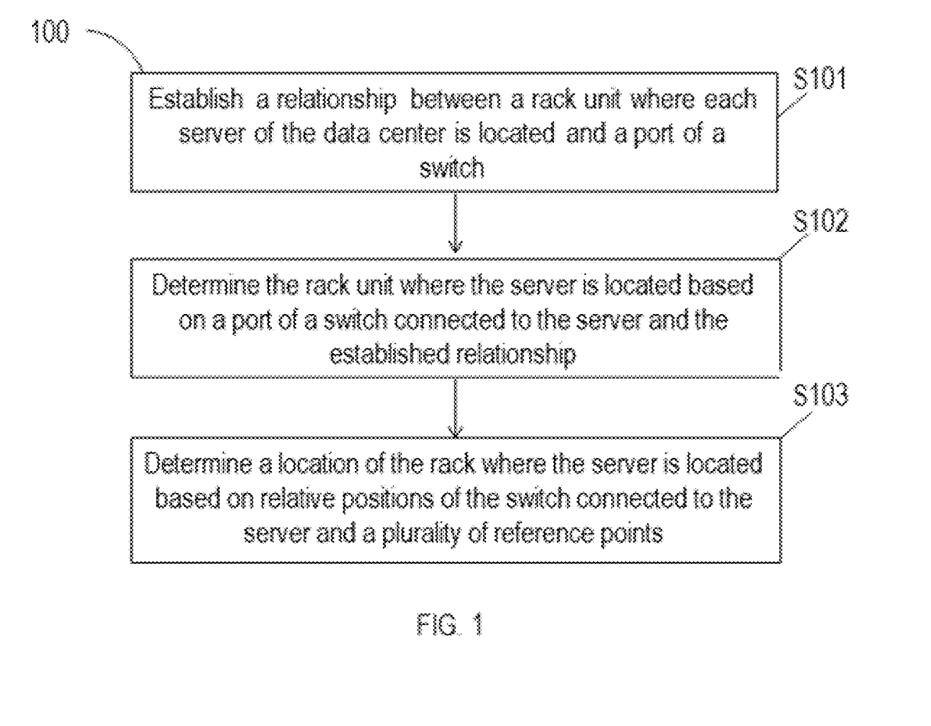
FIG. 1 schematically illustrates a flow chart of a method of determining a location of a server in a data center according to an exemplary embodiment of the present disclosure.

FIG. 1 schematically illustrates a flow chart of a method 100 of determining a location of a server in a data center according to an exemplary embodiment of the present disclosure. Reference is made to FIG. 1 to describe specific steps of the method 100. At step S101, relationship between a rack unit where each server of the data center is located and a port of a switch is established. At step S102, the rack unit where the server is located is determined based on a port of a switch connected to the server and the established relationship. At step S103, a location of the rack where the server is located is determined based on relative positions of the switch connected to the server and a plurality of reference points.

According to one embodiment, a server may be determined based on a MAC address. In a further embodiment, a MAC address is a physical address of a server and located at a data link layer, so it may not be affected by configuration such as virtualization of an upper level, and has very good stability. In one embodiment, a switch may include a top of rack (TOR) switch. In a further embodiment, a TOR switch may refer to a configuration manner of a switch, i.e., one or more switches are arranged on each rack. In a further embodiment, generally, a TOR switch may be placed on top of the rack, or in the middle of the rack.

In one embodiment, establishing a relationship between a rack unit where each server of a data center is located and a port of a switch may include associating each server with a port having a port identifier corresponding to a rack unit where each server is located In a further embodiment, a port identifier may be a port serial number or a group number of the port and intra-group serial number. In a further embodiment, any rule may be feasible so long as an association relationship can be established. In embodiments to be described with reference to FIGS. 2 and 3, grouping switch ports, and a specific implementation of connecting each server with a port having a corresponding port group number and intra-group serial number will be detailed.

In one embodiment, determining a rack unit where a server is located based on a port of a switch connected to the server and an established relationship may include determining a port via which a server may be connected to the switch based on a port identifier in a communication protocol used between a server and a port of a switch. A further embodiment may include determining a rack unit where a server may be located based on a determined port and an established relationship. In a further embodiment, a communication protocol may include various protocols that may advertise its own port information to a neighbor, such as Cisco Discovery Protocol, Extreme Discovery Protocol, Foundry Discovery Protocol, Nortel Discovery Protocol, and Microsoft's Link Layer Topology Discovery. In a further embodiment, these protocols may be protocols customized by manufacturers and may usually include relatively sound configuration performance. In a further embodiment, if a manufacturer of a devices in a data center is the same, it may be very easy to implement principles of the present disclosure according to any one of these protocols. In a alternate embodiment, however, a data center may usually include network apparatuses of multiple manufacturers, which may cause much inconvenience. In one embodiment, determining a port via which a server may be connected to a switch based on a port identifier in a communication protocol used between a server and a port of a switch may include determining a port via which a server may be connected to thae switch based on a port identifier included in a predetermined type-length-value of a Link Layer Discovery Protocol (LLDP) used between a server and a port of a switch. According to one embodiment, the TLV may include a Port ID.

In one embodiment, a LLDP may be a neutral link layer protocol of a manufacturer and may provide a standard link layer discovery manner. In a further embodiment, LLDP information may be sent by devices from each of their interfaces at a fixed interval, in the form of an Ethernet frame. In a further embodiment, each frame may contain one LLDP Data Unit (LLDPDU). In a further embodiment, each LLDPDU may be a sequence of type-length-value (TLV) structures. In a further embodiment, each LLDP frame may start with a following mandatory TLVs: Chassis ID, Port ID, and Time-to-Live. In a further embodiment, mandatory TLVs may not be omitted. In a further embodiment, mandatory TLVs may be followed by any number of optional TLVs. In a further embodiment, it may be possible to encapsulate a port number in a certain TLV so that a port number of a switch may be determined when a server communicates with a port of a switch. In a further embodiment, a TLV may include a Port ID. In a further embodiment, a Port ID may be the TLV which may be preset by a LLDP and may not be omitted, so that principles of the present disclosure may be implemented conveniently.

In one embodiment, step S102 may further include determining a geographic location of a data center based on a communication protocol used between a server and a switch. In a further embodiment, determining a geographic location of a data center based on a communication protocol used between a server and a switch may include determining a geographic location of a data center based on a type-length-value in a Link Layer Discovery Protocol (LLDP) used between a server and a switch. In a further embodiment, a LLDP protocol may include a plurality of TLVs, so a location of a data center may be recorded in a certain TLV. In an example embodiment, "US eastern XX data center" may be recorded in a TLV. In a further embodiment a TLV may be a Chassis ID. In a further embodiment, a geographic location of a data center may be determined so as to determine a geographic location of a server on the earth. In a further embodiment, a Chassis ID may include a rack serial number. In embodiments of the present disclosure, description of a geographic location herein may mainly be used to determine a geographic location of a data center, and a location of a rack may be positioned by the method described in step S103.

In one embodiment, according to a predetermined rule, each server may advertise its Chassis ID and Port ID. In a further embodiment, according to a rule defined in step S101, a rack unit where each server is located and rack information may be managed.

In one embodiment, determining a location of a rack where a server is located based on relative positions of a switch connected to a server and a plurality of reference points may include determining distances between a switch and a plurality of reference points. A further embodiment may include determining a location of a rack based on a determined distance. In a further embodiment, determining distances between a switch and a plurality of reference points may include determining distances between a switch and a plurality of reference points based on attenuation of signals of transmitters at a plurality of reference points as received by a switch. In a further embodiment, determining distances between a switch and a plurality of reference points based on attenuation of signals of transmitters at a plurality of reference points as received by a switch may include determining distances between a switch and a plurality of reference based on an International Telecommunication Union (ITU) indoor propagation model.

In one embodiment, a transmitter may include a WiFi access point. In a further embodiment, additionally, a WiFi receiver may be connected together to a switch or integrated in a switch. A specific embodiment of implementing determining distances between a switch and a reference points will be described in more detail below in connection with FIG. 4. In a further embodiment, determining a location of a rack based on determined distances may include determining a location of a rack by using a multi-lateration algorithm. A specific embodiment of implementing determining location of a rack will be described in more detail below in connection with FIG. 5.

Figure 2:
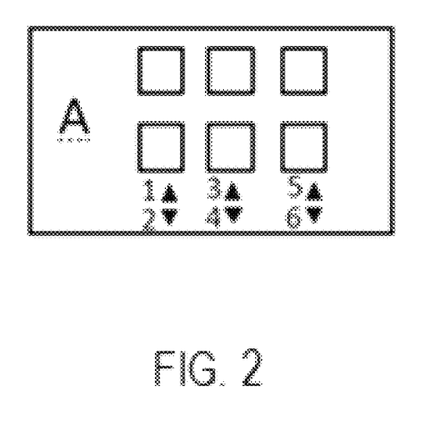
FIG. 2 schematically illustrates a rule for grouping switch ports according to an exemplary embodiment of the present disclosure.
Figure 3:
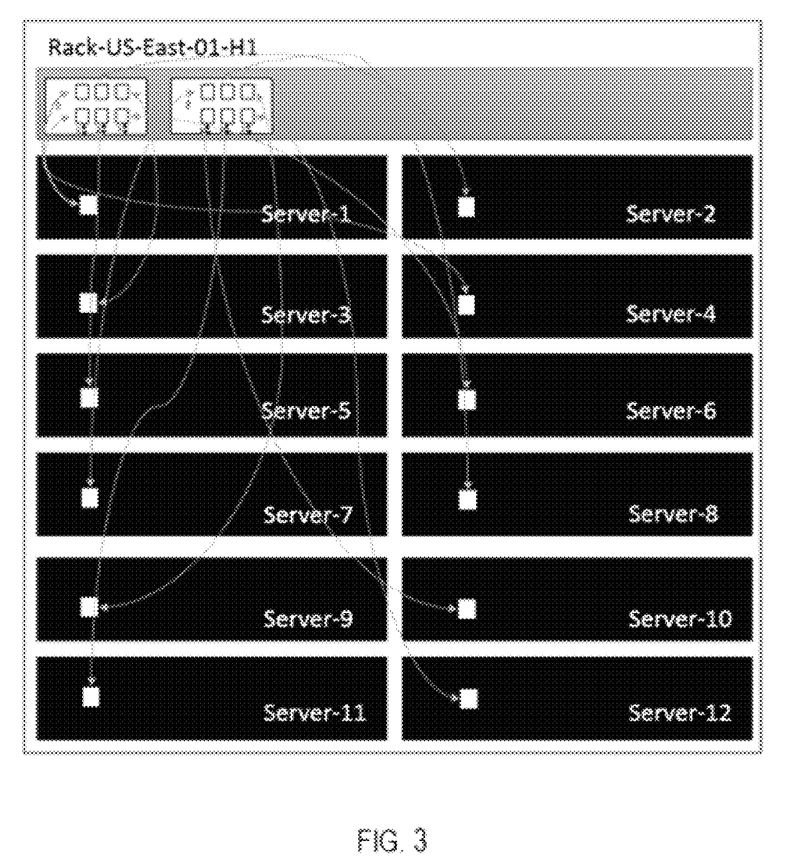
FIG. 3 schematically illustrates a rule for connecting a switch to a server according to an exemplary embodiment of the present disclosure.

Now turning to FIGS. 2 and 3, FIGS. 2 and 3 illustratively show a specific implementation of establishing a relationship between a rack unit where each server of a data center is located and a port of a switch according to an exemplary embodiment of the present disclosure. In one embodiment, a switch may have a plurality of ports. In a further embodiment, a switch may usually have 24, 36, 48 or 72 ports. In a further embodiment, for sake of brevity, FIGS. 2 and 3 only illustrate partial ports of a switch. In a further embodiment, grouping may be intended to more easily describe a relationship between a switch and a server. In a further embodiment, grouping may not be performed, and instead, a port of a switch with a serial number may be connected to a server having a corresponding serial number. In a further embodiment, an established relationship may be stored in a central management system, and a central management system may perform automatic management and configuration. In a further embodiment, a common central management system may be a central management database (CMDB). In a further embodiment, a rule for establishing a relationship may be stored in a central management system, and the central management system may perform automatic management and configuration. In a further embodiment, since an association relationship may be relatively complicated, particularly for a large scale data center, a rule for establishing an association relationship may be stored in a central management system, and it may perform management. In a further embodiment, a rule may be fixed and may not affect networking. In a further embodiment, as a TOR switch may be a layer 2 device, it may not affect layout and virtualization of an upper layer, so it may have excellent stability.

FIG. 2 schematically illustrates a rule for grouping switch ports according to an embodiment of the present disclosure. As shown in FIG. 2, port group A includes six ports, and ports in the port group A further have intra-group serial numbers, 1-6 respectively.

FIG. 3 schematically illustrates a rule for connecting a switch with a server according to an embodiment of the present disclosure. For sake of brevity, FIG. 3 only shows connection ports of a server and does not show a specific form of the server. In addition, FIG. 3 only shows two groups, totally 12 switch ports, and correspondingly shows 12 rack units and 12 servers placed on the corresponding rack units. It is appreciated that these numbers are only for exemplary purpose and not intended to limit scope of the present disclosure. Additionally, a number of rack units, number of servers and number of ports of the switches are not certainly equal so long as the numbers can satisfy principles of the present disclosure.

As shown in FIG. 3, six ports in port group A are respectively connected to servers 1-6, and six ports in the port group B are respectively connected to servers 7-12. The rack units are sorted from left to right, and from up to down. In the port group A, port 1 is connected with server 1, port 2 is connected with server 2, and so on, and according to a sorting rule from left to right and from top to down, server 1 is located at rack unit 1, server 2 is located at rack unit 2, and so on. Regarding port group B, a connecting rule may be similar to port group A. It is noted that FIG. 2 and the related description only schematically illustrate a specific connecting rule, and any other connecting rules that may implement the concept of the present disclosure may not be excluded. Besides, as shown in FIG. 3, a Chassis ID corresponding to a rack may be "rack-US-east-01-H1".

Figure 4:
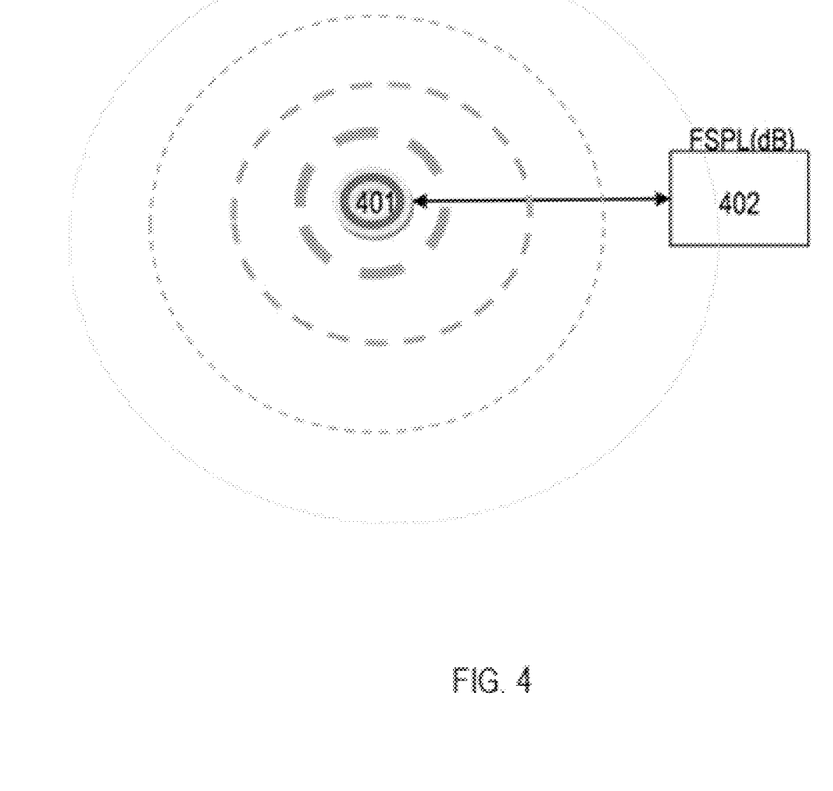
FIG. 4 schematically illustrates a signal propagation model according to an exemplary embodiment of the present disclosure.

Now turning to FIG. 4, FIG. 4 schematically illustrates a signal propagation model according to an exemplary embodiment of the present disclosure. To more clearly describe principles of the embodiments of the present disclosure, more detailed description will be given with reference to WiFi. WiFi may be a widely used wireless technology to connect local devices in home, public and industry facilities, and the WiFi Access Points (AP) and WIFI receivers working under IEEE 802.11 standard and are generally available in the market with relatively low price. Hence, using WiFi-related technology to implement the inventive concept of the present disclosure may achieve higher cost-effectiveness.

As shown in FIG. 4, smaller a distance between receiver 402 and access point 401 is, stronger a WiFi signal received by the receiver 402; and on the contrary, larger a distance between receiver 402 and access point 401 is, weaker a WiFi signal received by receiver 402. By measuring the received signal strength from Access Point 401, distance between WIFI receiver 402 and Access Point 401 can be calculated by the following formula:

$$FSPL = 20\log_{10}(d) + 20\log_{10}(f) + K \quad (1)$$

wherein FSPL represents a free space path loss in the unit dB; d is a distance between the WiFi receiver and WiFi access point; f is a signal frequency, K is a constant that depends on the units used for d and f.

In one embodiment, a WiFi receiver is generally located in an indoor environment, so it may be preferable to use an indoor propagation model, rather than a free space propagation model as represented by formula (1). In a further embodiment, an ITU indoor propagation model may be used to calculate a distance between WiFi receiver 402 and access point 401. In a further embodiment, an ITU indoor propagation model may be a radio propagation model that estimates a path loss inside a room or a closed area inside a building delimited by walls of any form.

According to the ITU indoor propagation model, $$L = 20\log_{10}(f) + N\log_{10}(d) + Pf(n) - 28 \text{ dB} \quad (2)$$

wherein L represents a path loss in a measure unit dB; f represents frequency of transmission in a measure unit MHz; d represents a distance in a measure unit meter; N represents a distance power loss coefficient; Pf(n) is a floor loss penetration factor; and n is Number of floors between the transmitter and receiver.

In one embodiment, N is an empirical coefficient. In a further embodiment, some empirical values are provided in Table 1. In a further embodiment, since most of WIFI APs works on a Frequency of 2.4 GHz or 5.8 GHz, the value for 2 GHz or 5.2 GHz may be used accordingly. In a further embodiment, it may be left as a parameter and customer may be allowed to adjust it according to the specific environment.

TABLE 1

| Frequency band | Residential area | Office area | Commercial area |
|---|---|---|---|
| 900 MHz | — | 33 | 20 |
| 1.2-1.3 GHz | — | 32 | 22 |
| 1.8-2 GHz | 28 | 30 | 22 |
| 4 GHz | — | 28 | 22 |
| 5.2 GHz | — | 31 | — |
| 60 GHz | — | 22 | 17 |
| 70 GHz | — | 22 | — |

In one embodiment, Pf (n) is an empirical constant dependent on the number of floors the waves need to penetrate. In a further embodiment, some values are tabulated in Table 2. In a further embodiment, WiFi access point may be deployed in the same floor as a switch, so the number of floors n is 1.

TABLE 2

| Frequency band | Residential area | Office area | Commercial area |
|---|---|---|---|
| 900 MHz | — | 9 (1 floor)<br>19 (2 floors)<br>24 (3 floors) | — |
| 1.8-2 GHz | 4n | 15 + 4 (n − 1) | 6 + 3 (n − 1) |
| 5.2 GHz | — | 16 | — |

In a further embodiment, the formula may be simplified as follows: For 2.4 GHz WIFI AP: L=45.6+N log 10(d) dB (N is an adjustable parameter); and For 5.8 GHz WIFI AP: L=55.6+N log 10(d) dB (N is an adjustable parameter).

In one embodiment, in a data center room, several Access Points may be deployed in fixed locations and fixed antenna direction. In a further embodiment, each AP may broadcast wireless signals via different identity or Service Set Identifier (SSID) on a specific frequency (2.4 GHz or 5 GHz). In a further embodiment, on a TOR switch of each rack, a WIFI receiver may be attached to a switch and may receive signals from all available APs in the data center building. In a further embodiment, a WIFI receiver may be able to detect a signal strength of a SSID network it connects to and then calculate a relative distance to the AP by using the method described above.

In one embodiment, relative distances to all APs inside a same data center room may be computed on a WIFI receiver of a TOR switch. In a further embodiment, relative distance between a Rack and the APs may be determined to the top level software. In a further embodiment, because locations of those APs may be pre-defined, and distances between APs and a receiver are already known, location of any rack in a data center room may be computed by a software algorithm.

In one embodiment, since a WIFI receiver may be attached to a TOR switch that may be physically located on a top level of a rack, and all APs may be installed in a ceiling level of a data center room, there may be nearly no physical obstacles in between the APs and the Wi-Fi receiver, so the signal strength may be sufficient and accuracy of the distance formula is well achieved. In a further embodiment, during initial setup of a data center, distance result of an AP may be calibrated on each rack to ensure best accuracy of distance calculation. According to embodiments and principles of the present disclosure a description in connection with WiFi technology is provided herein. It should be obvious to one skilled in the art that embodiments of the present disclosure are not limited to WiFi technology, but include any technologies such as Blue-tooth, radio frequency chip, NFC or the like.

Figure 5:
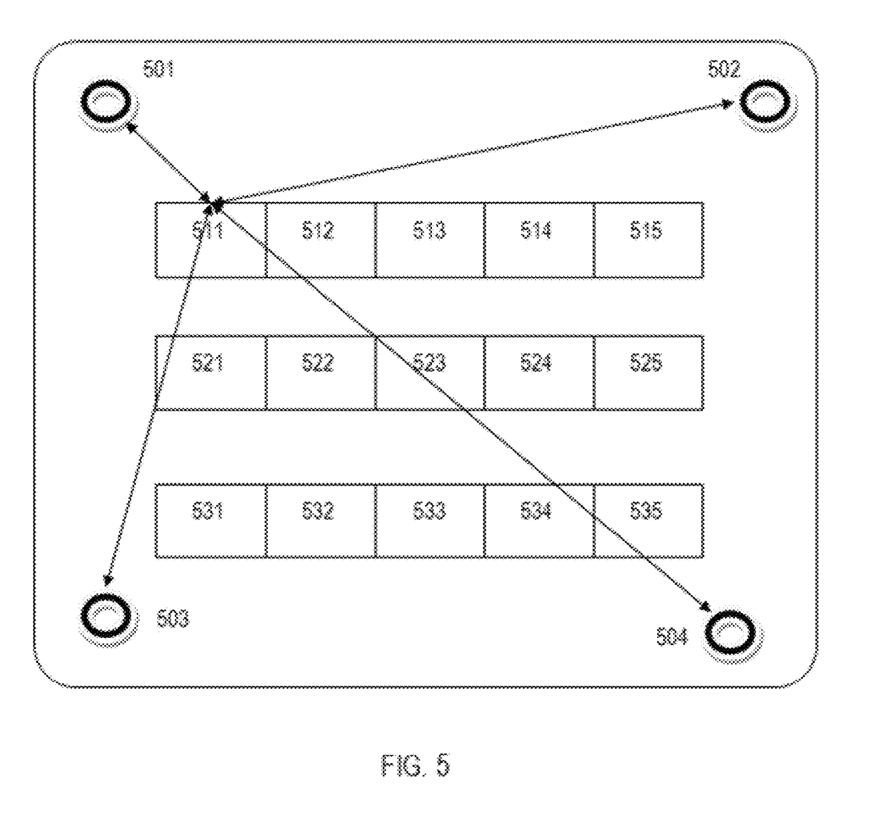
FIG. 5 schematically illustrates distribution of racks and multiple reference points according to an exemplary embodiment of the present disclosure.

Now referring to FIG. 5, FIG. 5 schematically illustrates distribution of racks and multiple reference points according to an exemplary embodiment of the present disclosure. As shown in FIG. 5, four reference points 501-504 are deployed at corners, and 15 racks 511-515, 521-525, 531-535 are deployed in the middle. It is noted that the number and configuration of these reference points and racks are only for exemplary purpose and not intended to limit the present disclosure. FIG. 5 further shows distances between a switch on rack 511 and four reference points 501-504. According to one, location of racks may be computed by using multi-lateration algorithm. In a further embodiment, in multi-lateration algorithm, location of a rack where a switch is located may be determined through distances between a switch and a plurality of reference points. In a further embodiment, a number of laterations of a multi-lateration algorithm may be equal to a number of reference points. In an example embodiment shown in FIG. 5, quad multi-lateration algorithm may be implemented. In a further embodiment, the present disclosure does not exclude use of a measurement algorithm wherein a number of laterations is less than a number of reference points (but at least equal to three), but preferably larger the number of sides, higher the precision. In a further embodiment, due to inevitable factors, determined distances between a switch and a plurality of reference points might have a certain error. In a further embodiment, an error may be minimized by increasing a number of the reference points, i.e., increasing a number of laterations in a multi-lateration algorithm.

In one embodiment, assume that there are n reference points (n≥3), and location of a switch is (x, y), di is a measured distance between a switch and an $i^{th}$ reference point (xi, yi), and Di is the real distance. In a further embodiment, difference between real distance and measured distance is Pi=|Di−di|. In a further embodiment, because of an inevitable error, Pi cannot be 0, and the solution of acquiring the best estimated location may be to use the least squares algorithm to make $\Sigma P_i^2$ minimum.

In one embodiment, for di, the formula is $$D_i^2 = (x_i - x)^2 + (y_i - y)^2 (i=1, 2, \ldots n) \quad (3)$$

In a further embodiment, the following formula may be obtained after variation:

$$x_i^2 + y_i^2 - D_i^2 = 2x \times x_i + 2y \times y_i - (x^2 + y^2)(i=1, 2, \ldots n) \quad (4)$$

In a further embodiment, using prior n−1 formulas minus the n-th one, new n−1 formulas may be obtained:

$$x_i^2 + y_i^2 - x_n^2 - y_n^2 - D_i^2 + D_n^2 = 2x \times (x_i - x_n) + 2y \times (y_i - y_n) \quad (5)$$

In one embodiment, let $$B = \begin{pmatrix} x_1^2 + y_1^2 - x_n^2 - y_n^2 - D_1^2 + D_n^2 \\ x_2^2 + y_2^2 - x_n^2 - y_n^2 - D_2^2 + D_n^2 \\ \ldots \\ x_{n-1}^2 + y_{n-1}^2 - x_n^2 - y_n^2 - D_{n-1}^2 + D_n^2 \end{pmatrix}$$

$$X = \begin{pmatrix} x \\ y \end{pmatrix}$$

$$A = \begin{pmatrix} 2(x_1 - x_n) & 2(y_1 - y_n) \\ 2(x_2 - x_n) & 2(y_2 - y_n) \\ \dots & \dots \\ 2(x_{n-1} - x_n) & 2(y_{n-1} - y_n) \end{pmatrix}$$

In a further embodiment, therefore, AX=B. $\min\Sigma P_i^2$ means $\min|AX-b|_2$ (replacing $D_i$ with $d_i$ in B to get b). In a further embodiment, solution of X is $X=(A^TA)^{-1}A^Tb$, and location for a switch may be easily obtained. In a further embodiment, the more reference points there are, higher localization accuracy is obtained according to the multi-lateration algorithm.

Figure 6:
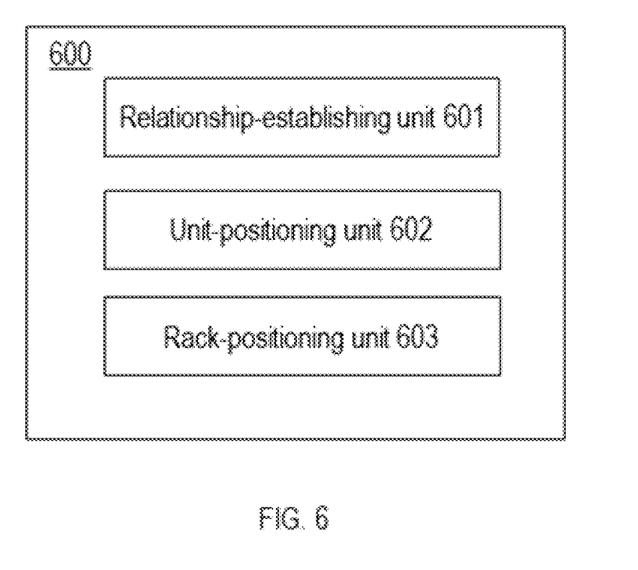
FIG. 6 schematically illustrates a block diagram of a device of determining a location of a server in a data center according to an exemplary embodiment of the present disclosure.

FIG. 6 schematically illustrates a block diagram of a device 600 of determining a location of a server in a data center according to an exemplary embodiment of the present disclosure. As shown in FIG. 6, device 600 includes relationship-establishing unit 601, unit-positioning unit 602 and rack-positioning unit 603. In one embodiment, a switch may include a top of rack (TOR) switch. In a further embodiment, a server may be determined based on a media access control (MAC) address.

Relationship-establishing unit 601 is configured to establish a relationship between a rack unit where each server of a data center is located and a port of a switch. Relationship-establishing unit 601 is further configured to: associate each server with a port having a port identifier corresponding to the rack unit where each server is located.

Unit-positioning unit 602 is configured to determine the rack unit where a server is located based on a port of a switch connected to the server and an established relationship by the relationship-establishing unit. Unit-positioning unit 602 includes a port-determining unit, that may be configured to determine the port via which the server is connected to the switch based on a port identifier in a communication protocol used between the server and the port of the switch; and unit-positioning unit 602 may be further configured to determine a rack unit where a server is located based on a determined port and an established relationship. A Port-determining unit is further configured to determine the port via which the server is connected to the switch based on a port identifier included in a predetermined type-length-value of a Link Layer Discovery Protocol (LLDP) used between a server and a port of a switch.

In one embodiment, predetermined type-length-value may include a Port ID. In a further embodiment, the device may further include: a geographic-positioning unit, that may be configured for determining a geographic location of a data center based on a communication protocol used between a server and a switch. In a further embodiment, the geographic-positioning unit may be further configured to: determine a geographic location of a data center based on a type-length-value in a Link Layer Discovery Protocol (LLDP) used between a server and a switch. In a further embodiment, type-length-value may include a Chassis ID.

Rack-positioning unit 603 is configured to determine a location of a rack where a server is located based on relative positions of a switch connected to a server and a plurality of reference points. Rack-positioning unit 603 further comprises: a distance-determining unit that may be configured to determine distances between a switch and a plurality of reference points. Rack-positioning unit 603 is further configured to determine location of a rack based on a determined distance. In a further embodiment, the distance-determining unit may be further configured to: determine distances between a switch and a plurality of reference points based on attenuation of signals of transmitters at a plurality of reference points as received by the switch. In a further embodiment, the distance-determining unit may be further configured to: determine distances between a switch and a plurality of reference based on an International Telecommunication Union (ITU) indoor propagation model. In a further embodiment, a transmitter may include a WiFi access point. Rack-positioning unit 603 is further configured to: determine location of a rack by using a multi-lateration algorithm.

Figure 7:
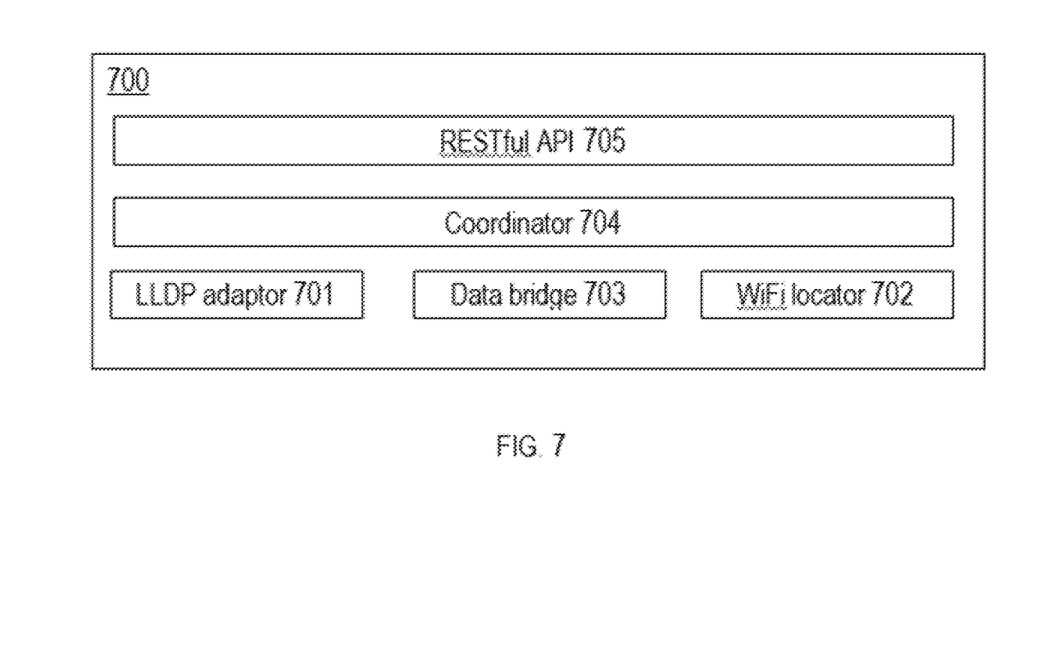
FIG. 7 schematically illustrates a block diagram of a reference system of determining a location of a server in a data center according to an exemplary embodiment of the present disclosure.

To more clearly understand the principle of the present disclosure, FIG. 7 further provides a block diagram of a specific reference system 700 for implementing principles of the present disclosure. In the construction of the system 700, issues in terms of hardware and software need to be considered. In one embodiment, several aspects need to be noted in respect of selection of WiFi receiver and WiFi access point. In a further embodiment, a verified WIFI Receiver and a WIFI AP (Access Point) may be required to provide stability and meet precision requirements. In a further embodiment, both WIFI Receiver and WIFI AP may consider some indicators of precision, such as Frequency Error, Error Vector Magnitude (EVM), Band Edges and Harmonics, Receiver Sensitivity, Receiver Maximum Input Level, and Receive Adjacent Channel Rejection.

In one embodiment, in respect of software, it may be required that a driver of WIFI receiver at least may provide capabilities to query Received Signal Strength Indicator (RSSI) and signal quality by given SSID precisely. In a further embodiment, a geographical location information may be set into the switches via LLDP, and geographical location and port information may be read from switches via LLDP. In a further embodiment, APIs for querying information may also be provided. In a further embodiment, there may be further provided a calculator for calculating distances between a switch and an access points, and calculating switches' coordinate by distances to access points. In a further embodiment, a coordinator for the whole system may be provided.

As shown in FIG. 7, the system comprises: LLDP adapter 701, WiFi locator 702, data bridge 703, coordinator 704 and RESTful API 705. As shown in FIG. 7, LLDP adapter 703 is configured to implement the function of unit-positioning unit 602 of device 600, namely, determine the rack unit where the server is located. Specifically, LLDP adapter 701 may determine PORT ID from a given MAC address. However, as in the above description of unit-positioning unit 602, its function may not be limited to this. WiFi locator 702 is used to implement the function of rack-positioning unit 603 of device 600, namely, determine the location of the rack. In one embodiment, a WiFi locator may include a WiFi data reader which receives RSSI or similar signal data from a WiFi receiver. In one embodiment, additionally, WiFi locator 702 may further calculate a location of a rack according to various algorithms. The data bridge connects LLDP adapter 701 with WiFi locator 702. Since each rack has its own LLDP adapter 701 and WiFi locator 702, system 700 is a nature distributed system, where data is gathered and tidied up, and then transmitted to coordinator 704 for next use. However, as mentioned above, embodiments of the present disclosure are not limited to whether the specific implementation is a distributed or centered way. In case of a centered way, network should be regarded as a simple Data Bridge as well. Coordinator 704, on the whole, coordinates LLDP adapter 701 and WiFi locator 702 to obtain a unified view of the data center. To enable easier integration with a graphic user interface (GUI), RESTful API 705 may be provided optionally.

In the description of the embodiments of the present disclosure, the term "comprise" and like wording should be understood to be open-ended, i.e., to mean "including but not limited to". The term "based on" should be understood as "at least partially based on". The term "an embodiment" or "the embodiment" should be understood as "at least one embodiment".

It should be appreciated that embodiments of the present disclosure may be implemented by hardware, software or a combination thereof. The hardware part may be implemented using a dedicated logic; the software part may be stored in the memory, executed by an appropriate instruction executing system, e.g., a microprocessor or a dedicatedly designed hardware. Those ordinary skilled in art may understand that the above device and method may be implemented using a computer-executable instruction and/or included in processor control code. In implementation, such code is provided on a medium such as a programmable memory, or a data carrier such as optical or electronic signal carrier.

In addition, although operations of the present methods are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution. It should be appreciated that features and functions of two or more devices according to the present disclosure may be embodied in one device. On the contrary, features and functions of one device as depicted above may be further divided into and embodied by a plurality of devices.

Although the present disclosure has been depicted with reference to a plurality of embodiments, it should be understood that the present disclosure is not limited to the disclosed embodiments. Embodiments of the present disclosure intend to cover various modifications and equivalent arrangements included in the spirit and scope of the appended claims.

What is claimed is:

1. A method of determining a location of a server in a data center, the method comprising:
    establishing a relationship between a rack unit where each server of the data center is located and a port of a switch;
    determining the rack unit where the server is located based on the port of the switch connected to the server and an established relationship;
    determining a location of the rack unit where the server is located based on relative positions of the switch connected to the server and a plurality of reference points; and
    wherein determining the rack unit where the server is located based on a port of a switch connected to the server and an established relationship comprises:
    determining the port via which the server is connected to the switch based on the port identifier in a communication protocol used between the server and the port of the switch; and
    determining the port via which the server is connected to the switch based on a port identifier included in a predetermined type-length-value of a Link Layer Discovery Protocol used between the server and the port of the switch, wherein the predetermined type-length-value comprises a Port ID.

2. The method of claim 1, wherein the switch comprises a top of rack switch.

3. The method of claim 1, wherein the server is determined based on a media access control address.

4. The method of claim 1, wherein establishing a relationship between the rack unit where each server of the data center is located and a port of a switch comprises:
    associating each server with a port having a port identifier corresponding to the rack unit where the each server is located.

5. The method of claim 1, further comprising:
    determining a geographic location of the data center based on the communication protocol used between the server and the switch; wherein determining the geographic location of the data center comprises:
    determining the geographic location of the data center based on the type-length-value in the Link Layer Discovery Protocol used between the server and the switch, and the type-length-value comprises a Chassis ID.

6. The method of claim 1, wherein determining the location of the rack unit where the server is located based on relative positions of the switch connected to the server and a plurality of reference points comprises:
    determining distances between the switch and the plurality of reference points; and
    determining the location of the rack unit based on the determined distances.

7. The method of claim 6, wherein determining distances between the switch and the plurality of reference points comprises:
    determining distances between the switch and the plurality of reference points based on attenuation of signals of transmitters at the plurality of reference points, wherein the signals are received by the switch, and the transmitter comprises a WiFi access point.

8. The method of claim 7, wherein determining distances between the switch and the plurality of reference points based on attenuation of signals of transmitters at the plurality of reference points comprises:
    determining the distances between the switch and the plurality of reference based on an International Telecommunication Union indoor propagation model.

9. The method of claim 6, wherein determining the location of the rack unit based on the determined distances comprises:
    determining the location of the rack unit using a multilateration algorithm.

10. A device of determining a location of a server in a data center, the device configured to:
    establish a relationship between a rack unit where each server of the data center is located and a port of a switch;
    determine the rack unit where the server is located based on the port of the switch connected to the server and an established relationship;
    determine a location of the rack unit where the server is located based on relative positions of the switch connected to the server and a plurality of reference points; and
    determine the port via which the server is connected to the switch based on the port identifier in a communication protocol used between the server and the port of the switch; and determine the port via which the server is connected to the switch based on a port identifier included in a predetermined type-length-value of a Link Layer Discovery Protocol used between the server and the port of the switch, wherein the predetermined type-length-value comprises a Port ID;

wherein the device includes one or more processors and memory.

11. The device of claim 10, wherein the switch comprises a top of rack switch.

12. The method of claim 10, wherein the server is determined based on a media access control address.

13. The device of claim 10, further configured to associate each server with a port having a port identifier corresponding to the rack unit where the each server is located.

14. The device of claim 10, further configured to:

determine a geographic location of the data center based on the communication protocol used between the server and the switch; wherein determining the geographic location of the data center comprises:

determine the geographic location of the data center based on the type-length-value in the Link Layer Discovery Protocol used between the server and the switch, and the type-length-value comprises a Chassis ID.

15. The device of claim 10, further configured to:

determine distances between the switch and the plurality of reference points; and determine the location of the rack unit based on the determined distances.

16. The method of claim 15, further configured to:

determine distances between the switch and the plurality of reference points based on attenuation of signals of transmitters at the plurality of reference points, wherein the signals are received by the switch, and the transmitter comprises a WiFi access point.

17. The device of claim 16, further configured to:

determine the distances between the switch and the plurality of reference based on an International Telecommunication Union indoor propagation model.

18. A computer program product comprising: a non-transitory computer readable medium encoded with computer executable program code, wherein the code enables execution across one or more processors to establish a relationship between a rack unit where each server of the data center is located and a port of a switch;

determine the rack unit where the server is located based on the port of the switch connected to the server and an established relationship;

determine a location of the rack unit where the server is located based on relative positions of the switch connected to the server and a plurality of reference points; and wherein determining the rack unit where the server is located based on a port of a switch connected to the server and an established relationship comprises:

determining the port via which the server is connected to the switch based on the port identifier in a communication protocol used between the server and the port of the switch; and determining the port via which the server is connected to the switch based on a port identifier included in a predetermined type-length-value of a Link Layer Discovery Protocol used between the server and the port of the switch, wherein the predetermined type-length-value comprises a Port ID.

* * * * *